United States Patent
Li et al.

(10) Patent No.: US 12,379,795 B2
(45) Date of Patent: Aug. 5, 2025

(54) CONTROL METHOD, ELECTRONIC DEVICE, AND STORAGE MEDIUM

(71) Applicant: Lenovo (Beijing) Limited, Beijing (CN)

(72) Inventors: Changfu Li, Beijing (CN); Rongge Sun, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/538,665

(22) Filed: Dec. 13, 2023

(65) Prior Publication Data

US 2024/0220038 A1 Jul. 4, 2024

(30) Foreign Application Priority Data

Dec. 30, 2022 (CN) .......................... 202211737391.6

(51) Int. Cl.
G06F 3/038 (2013.01)
G06F 3/041 (2006.01)
G06F 3/044 (2006.01)

(52) U.S. Cl.
CPC ........ *G06F 3/0383* (2013.01); *G06F 3/04182* (2019.05); *G06F 3/0441* (2019.05)

(58) Field of Classification Search
CPC ...................... G06F 3/0383; G06F 3/041–047
See application file for complete search history.

(56) References Cited

U.S. PATENT DOCUMENTS 8,089,474 B2 * 1/2012 Geaghan ............. G06F 3/03545
345/174
2008/0158165 A1 * 7/2008 Geaghan ............. G06F 3/03545
345/173

* cited by examiner

*Primary Examiner* — Gene W Lee
(74) *Attorney, Agent, or Firm* — ANOVA LAW GROUP, PLLC

(57) ABSTRACT

A control method includes obtaining parameter information of a touch assembly of a first electronic device and sending a notification message to a second electronic device based on the parameter information. The parameter information is related to sensing capability of the touch assembly. The notification message is related to an intensity of a signal transmitted by the second electronic device to the touch assembly. The first electronic device is configured to generate touch information based on the signal.

14 Claims, 6 Drawing Sheets

CONTROL METHOD, ELECTRONIC DEVICE, AND STORAGE MEDIUM

CROSS-REFERENCE TO RELATED APPLICATION

This application claims priority to Chinese Patent Application No. 202211737391.6, filed on Dec. 30, 2022, the entire content of which is incorporated herein by reference.

TECHNICAL FIELD

The present disclosure generally relates to the field of electronic device technologies and, more particularly, to a control method, an electronic device, and a storage medium.

BACKGROUND

By adjusting intensity of signals sent by electronic devices to a maximum intensity, the signals are sent to the electronic devices including different touch assemblies to generate touch information and realize interaction between different electronic devices. Therefore, there is a lack of a way to adjust the intensity of the signals sent by the electronic devices.

SUMMARY

In accordance with the present disclosure, there is provided a control method including obtaining parameter information of a touch assembly of a first electronic device and sending a notification message to a second electronic device based on the parameter information. The parameter information is related to sensing capability of the touch assembly. The notification message is related to an intensity of a signal transmitted by the second electronic device to the touch assembly. The first electronic device is configured to generate touch information based on the signal.

Also in accordance with the present disclosure, there is provided a control method including receiving a notification message sent by a first electronic device and related to an intensity of a signal sent by a second electronic device to a touch assembly of the first electronic device, determining the intensity of the signal sent to the touch assembly of the first electronic device based on the notification message, and sending the signal with the determined intensity to the touch assembly of the first electronic device, to enable the first electronic device to generate touch information based on the signal.

Also in accordance with the present disclosure, there is provided an electronic system including a first electronic device and a second electronic device. The first electronic device includes a touch assembly and is configured to send a notification message to the second electronic device, and generate touch information according to the signal sent by the second electronic device. The notification message is related to an intensity of a signal transmitted by the second electronic device to the touch assembly. The second electronic device is configured to receive the notification message sent by the first electronic device, and determine the intensity of the signal transmitted to the touch assembly based on the notification message.

DETAILED DESCRIPTION OF THE EMBODIMENTS

Figure 1:
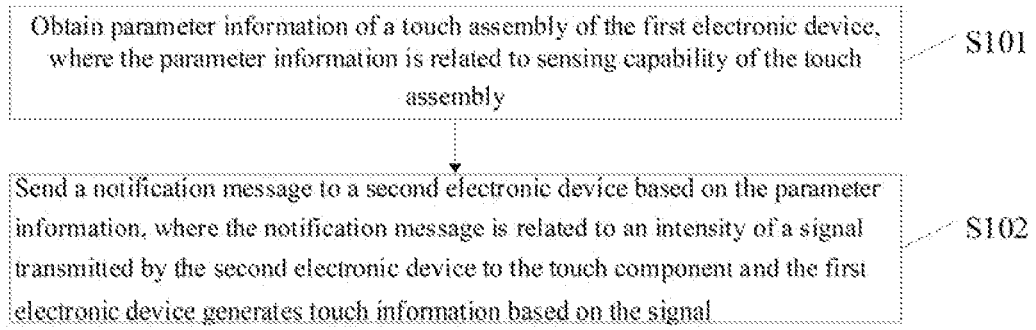
FIG. 1 is a flow chart of a control method consistent with the present disclosure.

Hereinafter, embodiments and features consistent with the present disclosure will be described with reference to drawings.

Various modifications may be made to the embodiments of the present disclosure. Thus, the described embodiments should not be regarded as limiting, but are merely examples. Those skilled in the art will envision other modifications within the scope and spirit of the present disclosure.

The accompanying drawings, which are incorporated in and constitute a part of this specification, illustrate embodiments of the present disclosure and, together with the general description of the present disclosure above and the detailed description of the embodiments below, serve to explain the principle of the present disclosure.

These and other features of the present disclosure will become apparent from the following description of non-limiting embodiments with reference to the accompanying drawings.

Although the present disclosure is described with reference to some specific examples, those skilled in the art will be able to realize many other equivalents of the present disclosure.

The above and other aspects, features, and advantages of the present disclosure will become more apparent in view of the following detailed description when taken in conjunction with the accompanying drawings.

Specific embodiments of the present disclosure are hereinafter described with reference to the accompanying drawings. The described embodiments are merely examples of the present disclosure, which may be implemented in various ways. Specific structural and functional details described herein are not intended to limit, but merely serve as a basis for the claims and a representative basis for teaching one skilled in the art to variously employ the present disclosure in substantially any suitable detailed structure.

In the present disclosure, the phrases such as "in one embodiment," "in another embodiment," "in yet another embodiment," or "in other embodiments," may all refer to one or more of different embodiments in accordance with the present disclosure. Different embodiments can also be combined as long as there is no conflict.

Terms such as "first\second\third" in this disclosure are only used to distinguish similar objects and do not represent a specific ordering of objects. The specific order or sequence may be interchanged where permitted so that the embodiments of the disclosure can be practiced in an order other than that illustrated in the drawings or described in the specification.

Unless otherwise defined, all terms (including technical terms and scientific terms) used herein have the same meanings as generally understood by those skilled in the art. Terms, such as those defined in general dictionaries, are to be understood to have meanings consistent with their meaning in the context of the technical field, and are not to be used in an idealistic or overly descriptive manner unless specifically defined here.

The present disclosure provides a control method, applied to a first electronic device. In one embodiment shown in FIG. 1, which is a flow chart of a control method provided by the present disclosure, the method at least includes S101 and S102.

In S101, parameter information of a touch assembly of the first electronic device is obtained. The parameter information may be related to sensing capability of the touch assembly.

In one embodiment, the parameter information may be parameter information determined when the first electronic device is not in contact with a second electronic device. For example, the parameter information may include at least one of capacitance value, resistance value, or environmental noise of a touch sensor when a touch display screen based on the touch sensor does not contact the capacitive stylus.

In one embodiment, the parameter information may include at least one of a capacitance value of the touch sensor in the touch assembly, a resistance value of the touch sensor, or an environment noise of the environment in which the touch assembly is located.

The environmental noise may include: current noise generated when the first electronic device is connected to a charging device, or capacitive noise when the touch assembly of the first electronic device detects palm pressure suppression. The touch assembly may include one of: a flexible screen, an electronic ink (E-ink) screen, or a foldable screen.

In S102, a notification message is sent to a second electronic device based on the parameter information.

In the above implementation process, by considering the information related to the sensing capability of the touch assembly, such as the capacitance value of the touch sensor in the touch assembly, the resistance value of the touch sensor, or the environmental noise of the environment where the touch assembly is located, the notification message may be sent to the second electronic device. Therefore, under various circumstances, the notification message that meets the application scenario may be determined based on multiple factors, to adjust the signal sent by the second electronic device. The power consumption of the second electronic device in the process of sending the signal may be reduced.

In one embodiment, the second electronic device may include a plurality of electrodes for sending and/or receiving messages, for example, including an Rx electrode for receiving the notification message.

In one embodiment, the notification message may include a plurality of different fields. For example, the notification message may include: a preamble, indicating adjusting the electrode voltage of the second electronic device; instruction bits, indicating a signal to be executed for the communication protocol used to send the notification message; and verification bits used to determine whether the decoded data under the communication protocol is correct. For example, the notification message may be an uplink signal (Uplink) as shown in Table 1. The number of bits of the preamble may be determined according to the number of voltage types. For example, for 16 voltage types, the preamble may be 16 bits. The notification message may be sent to the second electronic device through near field communication.

TABLE 1

| Voltage type | Verification bits | | | Mode | | Instruction bits | | | | Preamble | | |
|---|---|---|---|---|---|---|---|---|---|---|---|---|
| 1 | 0 | 1 | 1 | 0 | 0 | 1 | 1 | 0 | 0 | 0 | 0 | 0 |
| 2 | 1 | 1 | 0 | 0 | 0 | 1 | 1 | 0 | 0 | 0 | 0 | 1 |
| 3 | 0 | 1 | 0 | 0 | 0 | 1 | 1 | 0 | 0 | 0 | 1 | 0 |
| 4 | 1 | 1 | 1 | 0 | 0 | 1 | 1 | 0 | 0 | 0 | 1 | 1 |
| 5 | 0 | 0 | 0 | 0 | 0 | 1 | 1 | 0 | 0 | 1 | 0 | 0 |
| 6 | 1 | 0 | 1 | 0 | 0 | 1 | 1 | 0 | 0 | 1 | 0 | 1 |
| 7 | 0 | 0 | 1 | 0 | 0 | 1 | 1 | 0 | 0 | 1 | 1 | 0 |
| 8 | 1 | 0 | 0 | 0 | 0 | 1 | 1 | 0 | 0 | 1 | 1 | 1 |

As shown in Table 1, the Uplink signal is a 12-bit signal. Bits 0 to 2 of Uplink are the preambles; bits 3 to 7 of Uplink are the instruction bits; and bits 9 to 11 of Uplink are the verification bits.

The notification message may be related to the intensity of a signal transmitted by the second electronic device to the touch assembly, and the first electronic device may generate touch information based on this signal.

In some other embodiment, the intensity of the signal may be determined by a feedback message sent by the second electronic device to the first electronic device. For example, the intensity of the signal transmitted by the capacitive stylus to the touch display screen may be determined through a feedback message (downlink signal). The feedback message may also include: lever pressing signal, key pressing signal, etc. The capacitive stylus may send the lever pressing signal to the touch screen to determine the thickness of the capacitive stylus writing on the touch screen; or the capacitive stylus may send a key pressing signal to the touch screen to determine switching of functions when the capacitive stylus comes into contact with the touch screen. For example, Button 1 may indicate the pen writing function when touched, and Button 2 may indicate the eraser function when touched.

In one embodiment, in S102, sending the notification message to the second electronic device according to the parameter information may include: sending the notification message through a first channel from the touch assembly of the first electronic device to the second electronic device; or sending the notification message through a second channel from the first electronic device to the second electronic device. The first channel may be different from the second channel.

The first channel may use a timing protocol to implement data transmission between devices. For example, during the process of data transmission through the first channel, the notification message that complies with the timing protocol may be sent to the second electronic device to control the intensity of the signal sent by the second electronic device to the touch assembly of the first electronic device.

The second channel may use a Bluetooth transmission protocol to realize data transmission between devices. For example, the notification message may be sent to the second electronic device through Bluetooth instructions to control the intensity of the signal sent by the second electronic device to the touch assembly of the first electronic device.

In the present disclosure, the parameter information of the touch assembly of the first electronic device may be obtained and the parameter information may be related to the sensing capability of the touch assembly. Then, the notification message may be sent to the second electronic device based on the parameter information. The notification message may be related to the intensity of the signal transmitted by the second electronic device to the touch assembly, and the first electronic device may generate the touch information based on the signal. Correspondingly, the first electronic device may be able to adjust the intensity of the signal transmitted by the second electronic device to the touch assembly of the first electronic device by sending the notification message to the second electronic device. Therefore, the power consumption of the second electronic device may be reduced without the intensity of the signal affecting the generation of touch information. Thus, the battery life of the second electronic device is extended and user experience is improved.

Figure 2:
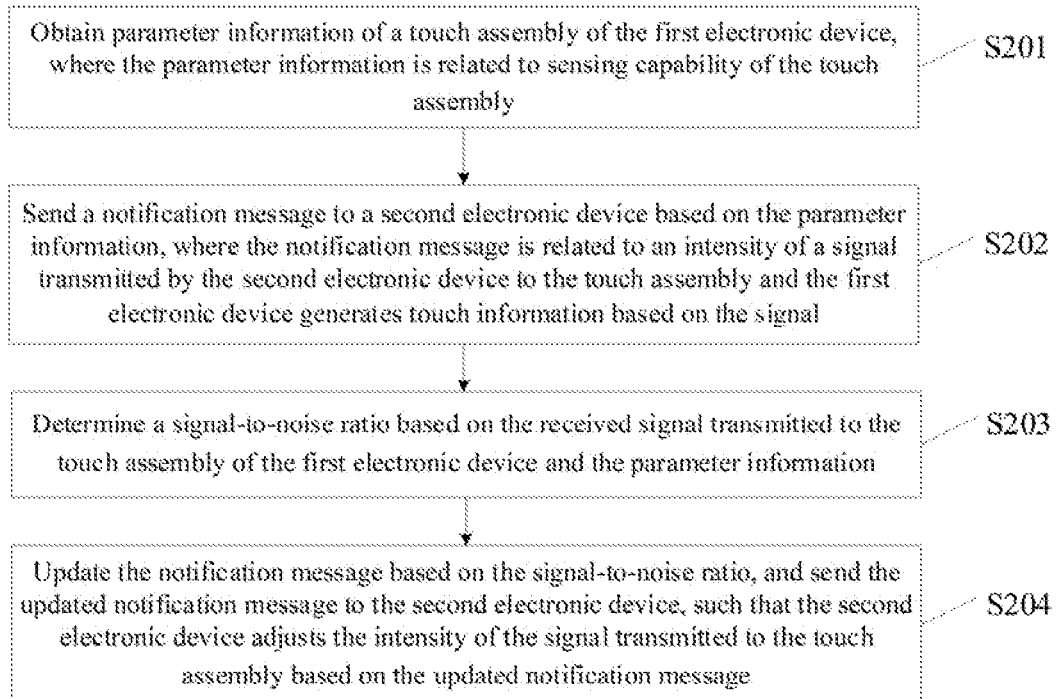
FIG. 2 is a flow chart of another control method consistent with the present disclosure.

Another embodiment of the present disclosure provides another control method. As shown in FIG. 2, which is a flow chart of the control method provided by the present embodiment, the method at least includes:

S201: obtaining the parameter information of the touch assembly of the first electronic device, where the parameter information may be related to the sensing capability of the touch assembly;

S202: sending the notification message to the second electronic device based on the parameter information, where the notification message is related to the intensity of the signal transmitted by the second electronic device to the touch assembly of the first electronic device and the first electronic device generates the touch information according to the signal;

S203: determining a signal-to-noise ratio according to the received signal transmitted to the touch assembly of the first electronic device and the parameter information; and S204: updating the notification message according to the signal-to-noise ratio and sending the updated notification message to the second electronic device, such that the second electronic device adjusts the intensity of the signal transmitted to the touch assembly according to the updated notification message.

For example, when the capacitive stylus is close to the touch display screen, the touch chip (Touch IC) of the touch assembly may calculate the signal-to-noise ratio (SNR) based on the capacitance value and the environmental noise of the touch sensor when there is no contact with the capacitive stylus combined with the signal amount (intensity of the signal) at the pen tip position when the capacitive stylus is close.

The touch chip in the first electronic device may convert the received signal transmitted to the touch assembly of the first electronic device and the parameter information into the sensing amount recognized by the touch assembly through an algorithm.

For example, Pen RawDataAvg represents the sensing amount of the received signal transmitted to the touch assembly of the first electronic device; and Pen RawDataStd represents the capacitance value, resistance value, or the environmental noise detected by the first electronic device. Correspondingly, the signal-to-noise ratio Pen SNR (dB) may be 20 log(Avg/Std).

In one embodiment, updating the notification message according to the signal-to-noise ratio in S204 may include one of:

when the signal-to-noise ratio is within a preset threshold range, updating the type of the notification message to a first type, where the first type means not to adjust the intensity of the signal transmitted by the second electronic device to the touch assembly;

when the signal-to-noise ratio is less than a lower limit of the preset threshold range, updating the type of the notification message to a second type, where the second type means increasing the intensity of the signal transmitted by the second electronic device to the touch assembly; and when the signal-to-noise ratio is larger than an upper limit of the preset threshold range, updating the type of the notification message to a third type, where the third type means to decrease the intensity of the signal transmitted by the second electronic device to the touch assembly.

When the type of the notification message is the first type, the notification message may not be adjusted. For example, in one embodiment, the second electronic device may be a capacitive stylus and the threshold range may be (b, a). When the SNR at this time is within the preset (b, a), it may be indicated that the pen tip signal amount of the capacitive stylus at this time does not need to be adjusted, and the notification message may be transmitted (execute the current Uplink signal) according to a preset time period or preset N cycles. After receiving the notification message (Uplink signal), the pen tip Rx may send an intensity signal of tip signal amount corresponding to the pen tip electrode voltage to the first electronic device. After N cycles, or after reaching the preset time period, the SNR calculation may be performed again.

When the SNR value is less than the preset lower threshold b, it may be indicated that the pen tip signal amount intensity is too small, and the Touch IC may add 1 to the pen tip signal amount intensity of the current protocol timing. After the pen tip receives the Uplink signal corresponding to the signal amount intensity increased by 1, Downlink code may be performed according to the preset tip electrode voltage after adding 1. Then, when the calculated SNR value of the Touch IC is between b~a, the signal may be transmitted according to this Uplink. When the calculated SNR value is still lower than the preset lowest threshold b, the pen tip signal amount intensity may be increased by 1 again, until the SNR value calculated by the Touch IC is between b~a.

When the SNR value is larger than the preset upper limit threshold a, indicating that the pen tip signal amount intensity is too large, the Touch IC may decrease the pen tip signal amount intensity of the current protocol timing by 1. After the pen tip receives the Uplink signal corresponding to the signal amount intensity minus 1, Downlink code may be performed according to the preset tip electrode voltage after decreasing by 1. Then, when the calculated SNR value of the Touch IC is between b~a, the signal may be transmitted according to this Uplink. When the calculated SNR value is still larger than the preset upper threshold a, the pen tip signal amount intensity may be decreased by 1 again until the SNR value calculated by the Touch IC is between b~a.

In the present disclosure, the signal-to-noise ratio may be determined based on the received signal transmitted to the touch assembly of the first electronic device and the parameter information. The notification message may be updated based on the signal-to-noise ratio, and the updated notification message may be sent to the second electronic device, such that the second electronic device adjusts the intensity of the signal transmitted to the touch assembly based on the updated notification message. Correspondingly, the signal intensity may be determined based on the noise, to adjust the intensity of the signal transmitted by the second electronic device to the touch assembly. Power consumption may be reduced, and the use time of the second electronic device may be extended.

Figure 3:
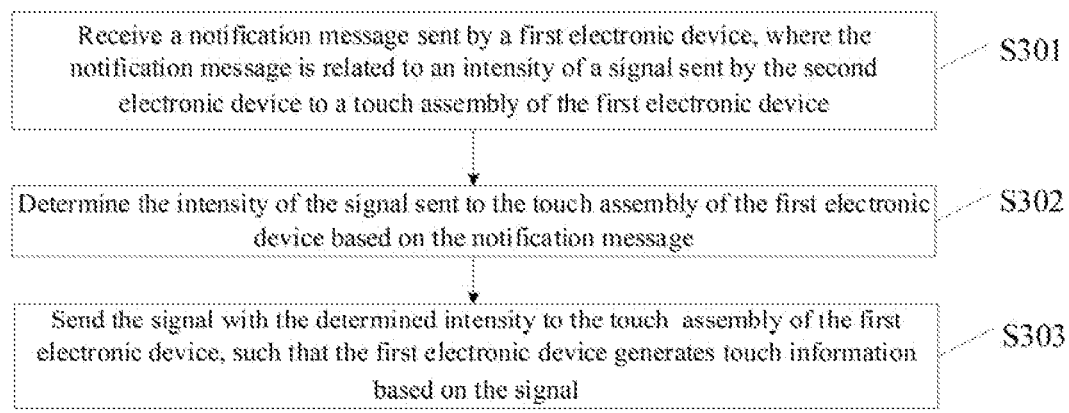
FIG. 3 is a flow chart of another control method consistent with the present disclosure.

The present disclosure also provides a control method applied to a second electronic device. In one embodiment shown in FIG. 3 which is a flow chart of the control method, the method at least includes:

S301: receiving a notification message transmitted by a first electronic device, where the notification message is related to the intensity of the signal transmitted from the second electronic device to a touch assembly of the first electronic device;

S302: determining the intensity of the signal transmitted to the touch assembly according to the notification message; and S303: transmitting the signal with the intensity to the touch assembly of the first electronic device, such that the first electronic device generates the touch message according to the signal.

In one embodiment, according to the proportional relationship between the pen tip signal amount intensity and the pen tip electrode coding voltage, various pen tip signal amount intensities may be preset. For example, as shown in Table 1, when the notification message is: 011001100000, the voltage type is 1, and the determined signal strength is the signal strength corresponding to the first type of voltage.

In one embodiment, the method may further include:

S304: receiving an updated notification message transmitted by the first electronic device; and S305: adjusting the intensity of the signal transmitted to the touch assembly according to the updated notification message.

For example, as shown in Table 1, when the updated notification message is: 110001100001, the voltage type is 2, and the determined signal strength is the signal strength corresponding to the second type of voltage.

In the present disclosure, the notification message transmitted by the first electronic device may be received and the notification message may be related to the intensity of the signal transmitted from the second electronic device to a touch assembly of the first electronic device. The intensity of the signal transmitted to the touch assembly may be determined according to the notification message; and the signal with the determined intensity may be transmitted to the touch assembly of the first electronic device, such that the first electronic device generates the touch message according to the signal. The intensity of the signal transmitted to the touch assembly of the first electronic device may be adjusted. Power consumption may be reduced, and the use time of the second electronic device may be extended.

One embodiment of the present disclosure where the touch assembly of the first electronic device is a touch display screen, the second electronic device is a capacitive stylus, the notification message is an uplink signal, and the channel between the first electronic device and the second electronic device adopts a timing protocol, will be used as an example to illustrate the present disclosure following.

At present, the performance of capacitive stylus is constantly improving. Combined with the current popularization of online education and paperless office, there are more and more application scenarios and demands for capacitive stylus. The touch displays that need to be matched are also diverse. There are many kinds of capacitive stylus produced. To make a capacitive stylus have a long battery life, the coding voltage of the pen tip of the capacitive stylus is limited to less than 20V. Therefore, the current consumption is reduced, but it also limits the intensity of the signal emitted from the pen tip to the touch display screen (that is, the pen tip signal amount intensity). When encountering a flexible screen, an electronic ink (E-ink) screen or a foldable screen, the capacitive stylus may be unable to write normally on the touch display screen because of too large values of the capacitance value and resistance value (RC loading) of the touch sensor in the touch display screen and excessive environmental noise (Noise). In existing technologies, the signal amount intensity of the pen tip of the capacitive stylus is designed and fixed to the maximum value.

Figure 4A:
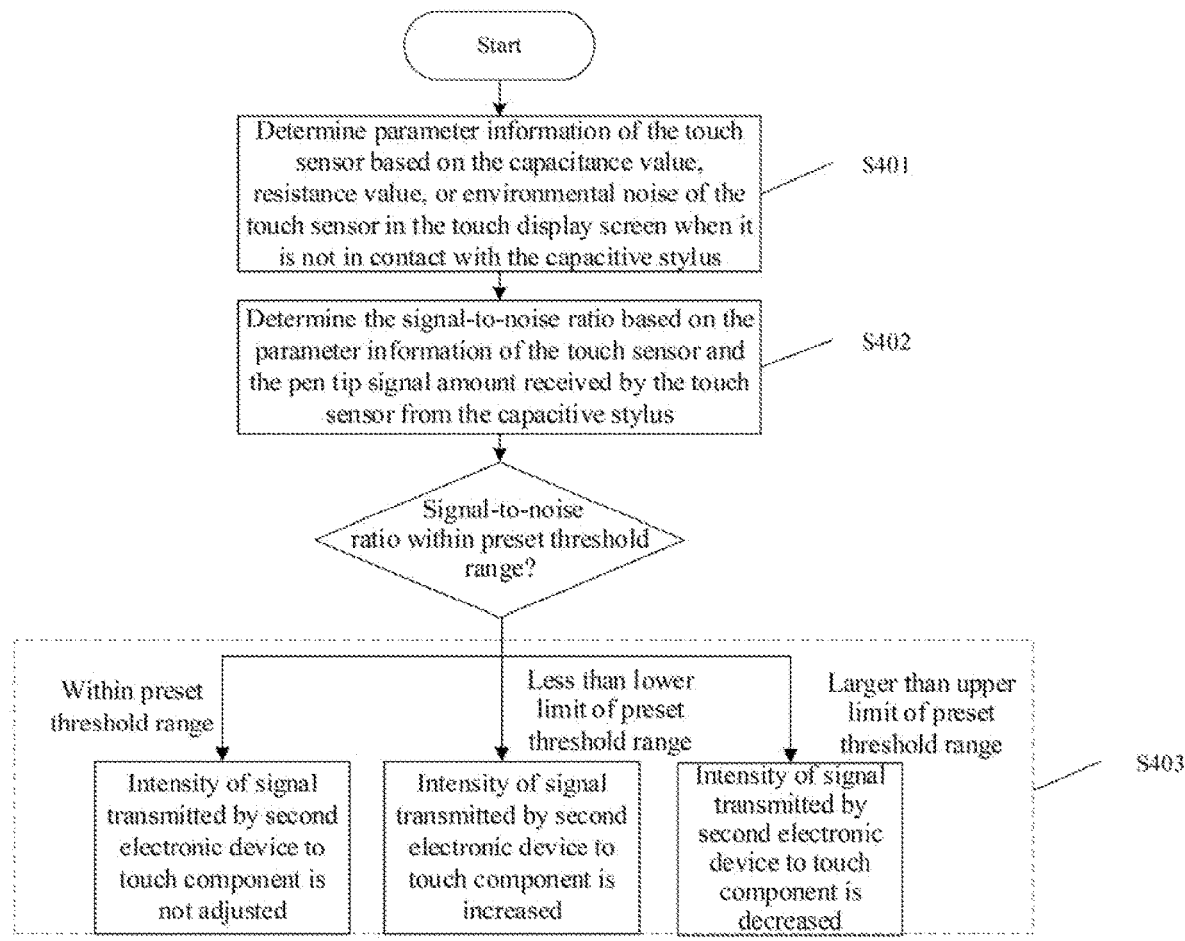
FIG. 4A is a flow chart of another control method consistent with the present disclosure.

The present disclosure provides a control method to at least partially alleviate the above problems. As shown in FIG. 4A, which is a flow chart of a control method provided by one embodiment of the present disclosure, the method at least includes S401 to S403.

In S401, the parameter information of the touch sensor is determined based on the capacitance value, resistance value, or environmental noise of the touch sensor in the touch display screen when it is not in contact with the capacitive stylus.

Figure 4B:
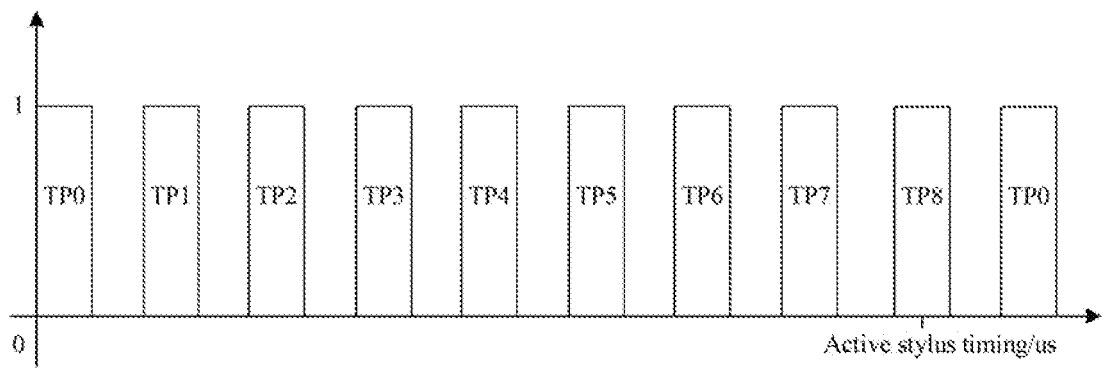
FIG. 4B is a schematic diagram showing a timing diagram of a two-way protocol of a capacitance pen consistent with the present disclosure.

In the present embodiment, the parameter information may be used to determine the notification message transmitted to the capacitive stylus. The notification message may be an uplink (Uplink) signal. Uplink signal may be used to communicate between the touch display screen and the capacitive stylus. FIG. 4B is a bidirectional protocol timing diagram of the capacitive stylus provided by the embodiment of the present application. In FIG. 4B, TP0 is the Uplink signal reported by the touch display screen to the capacitive stylus. TP1~TP8 are the downlink (Downlink) coding signals sent by the capacitive stylus to the touch display. As shown in Table 1, for the same communication protocol, such as the timing protocol, different pen tip electrode coding voltages may be preset based on different configurations of the preamble bits (Preamble bits) or specific command bits (CMD bits) in the Uplink signal. According to the relationship between the pen tip signal amount intensity and the pen tip electrode coding voltage, various pen tip signal amount intensities may be preset.

As shown in Table 1, the Uplink signal is a 12-bit signal. Bits 0 to 2 of the Uplink signal are preambles; bits 3 to 7 of the Uplink signal are command bits; bits 9 to 11 of the Uplink signal are check bits.

In one embodiment, S401 may be implemented through a touch chip (Touch IC) in the touch display screen.

In S402, based on the parameter information of the touch sensor and the pen tip signal amount received by the touch sensor from the capacitive stylus, the signal-to-noise ratio is determined.

The pen tip signal amount may be the pen tip signal intensity detected when the distance between the touch sensor and the capacitive stylus is less than a distance threshold. The pen tip signal has a transmission distance limit. When the distance between the touch sensor and the capacitive stylus is larger than the distance threshold, the touch sensor may not be able to detect the pen tip signal.

In one embodiment, S402 may be implemented through the touch chip (Touch IC) in the touch display screen.

For example, when the capacitive stylus is close to the touch display screen, the Touch IC may calculate the signal-to-noise ratio (SNR) based on the parameter information of the touch sensor and the signal amount (the signal intensity) at tip position of the capacitive stylus when the capacitive stylus is close.

In S403, when the signal-to-noise ratio is within a preset threshold range, the intensity of the signal transmitted by the second electronic device to the touch assembly is not adjusted; when the signal-to-noise ratio is less than the lower limit of the preset threshold range, the intensity of the signal transmitted by the second electronic device to the touch assembly is increased; and when the signal-to-noise ratio is greater than the upper limit of the preset threshold range, the intensity of the signal transmitted by the second electronic device to the touch assembly is reduced.

In one embodiment, the threshold range may be (b, a). When the SNR is within the preset (b, a), the pen tip signal amount of the capacitive stylus may not need to be adjusted at this time. The notification message may be transmitted according to the set N cycles or the preset duration (execute the current Uplink signal transmission). After the pen tip Rx receives the notification message (Uplink signal), the signal with an intensity of the pen tip signal amount corresponding to the pen tip electrode voltage may be sent to the first electronic device (performs downlink signal downlink coding). After N cycles, or after reaching the preset duration, SNR calculation may be performed again.

When the SNR value is less than the preset lower threshold b, it may be indicated that the pen tip signal amount intensity is too small, and the Touch IC may add 1 to the pen tip signal amount intensity of the current protocol timing. After the pen tip receives the Uplink signal corresponding to the signal amount intensity increased by 1, Downlink coding may be performed according to the preset tip electrode voltage after adding 1. Then, if the calculated SNR value of the Touch IC is between b~a, the signal may be transmitted according to this Uplink. If the calculated SNR value is still lower than the preset lowest threshold b, the pen tip signal amount intensity may be increased by 1 again, until the SNR value calculated by the Touch IC is between b~a.

When the SNR value is larger than the preset upper limit threshold a, indicating that the pen tip signal amount intensity is too large, the Touch IC may decrement the pen tip signal amount intensity of the current protocol timing by 1. After the pen tip receives the Uplink signal corresponding to the signal amount intensity minus 1, Downlink code may be performed according to the preset tip electrode voltage after decreased by 1. Then, when the calculated SNR value of the Touch IC is between b~a, the signal may be transmitted according to this Uplink. When the calculated SNR value is still larger than the preset upper threshold a, the pen tip signal amount intensity may be decreased by 1 again until the SNR value calculated by the Touch IC is between b~a.

In the present embodiment, after receiving the Uplink signal, the capacitive stylus may automatically adjust the pen tip signal amount intensity to adapt to the touch display with different RC loading or noise. When the touch display is in a scene with small RC loading and small noise, or when the touch screen in a scene with a large noise such as with a charger plugged or with palm pressure suppression, the Touch IC may determine the pen tip signal amount intensity corresponding to the scene and output the Uplink signal corresponding to the signal amount intensity. After the pen tip receives the Uplink signal, the pen tip electrode voltage may be generated to provide the pen tip signal amount to the touch display. Therefore, while ensuring that the pen tip signal amount intensity does not affect the writing function of the capacitive stylus, the output of the pen tip voltage may be reduced, thereby reducing the power consumption of the capacitive stylus, extending the battery life of the capacitive stylus, and enhancing the user's writing experience.

Figure 5:
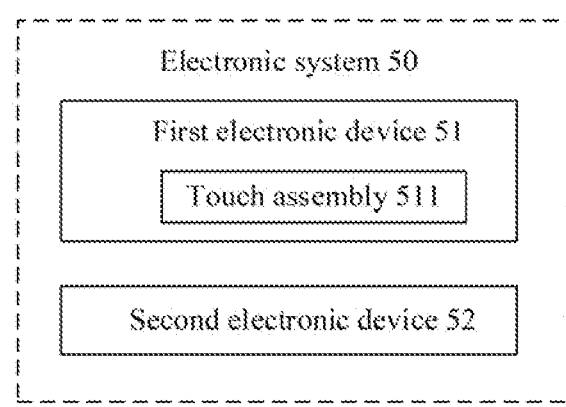
FIG. 5 is a schematic structural diagram showing an electronic system consistent with the present disclosure.

The present disclosure also provides an electronic system. In one embodiment shown in FIG. 5 which is a structural schematic diagram of the electronic system provided by the present embodiment, the electronic system 50 includes: a first electronic device 51 including a touch assembly 511, and a second electronic device 52.

The first electronic device may be configured to send a notification message to the second electronic device according to the parameter information. The notification message may be related to the signal strength sent by the second electronic device to the touch assembly of the first electronic device. Based on the intensity of the signal sent by the second electronic device, touch information may be generated.

The second electronic device may be configured to: receive the notification message sent by the first electronic device; and, based on the notification message, determine the intensity of the signal transmitted to the touch control component.

In one embodiment, the first electronic device 51 may be further configured to: determine a signal-to-noise ratio based on the received signal transmitted to the touch assembly of the first electronic device and the parameter information; update the notification message based on the signal-to-noise ratio; and send the updated notification message to the second electronic device, such that the second electronic device adjusts the intensity of the signal transmitted to the touch assembly based on the updated notification message.

The second electronic device 52 may be also configured to: receive the updated notification message sent by the first electronic device; and, based on the type of the updated notification message, adjust the intensity of the signal transmitted by the second electronic device to the touch assembly.

The present disclosure also provides a control device. Various components included in the control device may be implemented through a processor in the first electronic device, or through logic circuits. The processor may be a central processing unit (CPU), a micro processing unit (MPU), a digital signal processor (DSP), or a field programmable gate array (FPGA).

Figure 6:
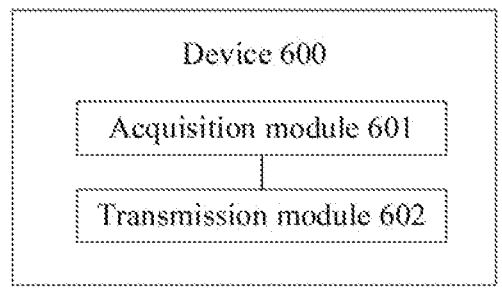
FIG. 6 is a schematic structural diagram showing a control device consistent with the present disclosure.

In one embodiment shown in FIG. 6, which is a structural schematic diagram of a control device 600, the control device 600 includes an acquisition module 601 and a transmission module 602.

The acquisition module 601 may be configured to acquire the parameter information of the touch assembly of the first electronic device. The parameter information may be related to the sensing capability of the touch assembly.

The transmission module 602 may be configured to send the notification message to the second electronic device based on the parameter information. The notification message may be related to the intensity of the signal transmitted by the second electronic device to the touch assembly. The first electronic device may generate touch information based on the signal.

In one embodiment, the parameter information may include at least one of: the capacitance value of the touch sensor in the touch assembly, the resistance value of the touch sensor, or the environment noise of the environment where the touch assembly is located.

In one embodiment, the transmission module 602 may be further configured to: send the notification message through the first channel between the touch assembly of the first electronic device and the second electronic device; or send the notification message to the second electronic device through the second channel between the first electronic device and the second electronic device. The first channel may be different from the second channel.

In one embodiment, the control device 600 may further include: a determining module configured to determine a signal-to-noise ratio based on the received signal transmitted to the touch assembly of the first electronic device and the parameter information. The transmission module 602 may be further configured to: update the notification message based on the signal-to-noise ratio, and send the updated notification message to the second electronic device, such that the second electronic device adjusts the intensity of the signal transmitted to the touch assembly based on the updated notification message.

In one embodiment, the transmission module 602 may be also configured to: when the signal-to-noise ratio is within the preset threshold range, update the type of the notification message to the first type indicating that the intensity of the signal transmitted by the second electronic device to the touch assembly is not adjusted; when the signal-to-noise ratio is less than the lower limit of the preset threshold range, update the type of the notification message to the second type indicating increasing the intensity of the signal emitted by the second electronic device to the touch assembly; or, when the signal-to-noise ratio is greater than the upper limit of the preset threshold range, update the type of the notification message to the third type indicating reducing the intensity of the signal emitted by the second electronic device to the touch assembly.

The present disclosure also provides a control device. Various components included in the control device may be implemented through a processor in the second electronic device, or through logic circuits. The processor may be a central processing unit (CPU), a micro processing unit (MPU), a digital signal processor (DSP), or a field programmable gate array (FPGA).

Figure 7:
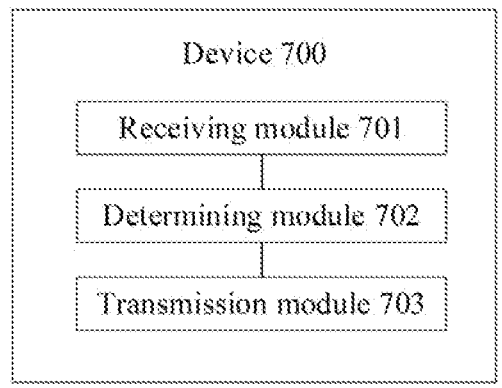
FIG. 7 is another schematic structural diagram showing a control device consistent with the present disclosure.

In one embodiment shown in FIG. 7, which is a structural schematic diagram of a control device 700, the control device 700 includes a receiving module 601, a determining module 702, and a transmission module 703.

The receiving module 701 may be configured to receive the notification message sent by the first electronic device, where the notification message is related to the signal strength sent by the second electronic device to the touch assembly of the first electronic device.

The determining module 702 may be configured to determine the intensity of the signal transmitted to the touch assembly based on the notification message.

The transmission module 703 may be configured to send the signal of the determined intensity to the touch assembly of the first electronic device such that the first electronic device generates the touch information based on the signal.

In one embodiment, the receiving module 701 may be further configured to: receive the updated notification message sent by the first electronic device. The device 700 may be further configured to: based on the type of the updated notification message, adjust the intensity of the signal transmitted by the second electronic device to the touch assembly.

The description of the above device embodiments is similar to the description of the above method embodiments, and may have similar beneficial effects as the method embodiments. For technical details not disclosed in the device embodiments, the reference may be made to the description of the method embodiments.

The above methods provided by the various embodiments of the present disclosure may be implemented in the form of a software function module and sold or used as an independent product. Therefore, the software function module may be stored in a computer-readable storage medium. The technical solutions or those that contribute to related technologies of the embodiments of the present disclosure may be embodied in the form of software products. The computer software products may be stored in a storage medium and include a number of instructions to enable the electronic device executes all or part of the methods described in various embodiments of the present disclosure. The aforementioned storage media may include: a flash disk, a mobile hard disk, a read only memory (ROM), a magnetic disk, an optical disk, or other various media that can store program codes. As such, embodiments of the present disclosure are not limited to any specific combination of hardware and software.

Correspondingly, one embodiment of the present disclosure provides a computer-readable storage medium on which a computer program is stored. When the computer program is executed by a processor, any of the methods described in the above embodiments may be implemented.

Correspondingly, one embodiment of the present disclosure provides a chip. The chip may include programmable logic circuits and/or program instructions. When the chip is running, it may be configured to implement any of the methods in the above embodiments.

Correspondingly, one embodiment of the present disclosure provides a computer program product, which, when executed by a processor of an electronic device, is configured to implement the steps in any of the methods described in the above embodiments.

Figure 8:
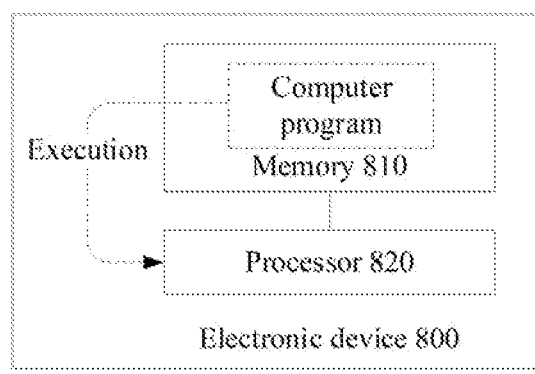
FIG. 8 is another schematic structural diagram showing an electronic device consistent with the present disclosure.

The present disclosure also provides an electronic device for implementing the control method described in the above method embodiments. FIG. 8 is a schematic diagram of the hardware entity of an electronic device provided by an embodiment of the present disclosure. As shown in FIG. 8, the electronic device 800 includes a memory 810 and a processor 820. The memory 810 may be configured to store computer programs that may be run on the processor 820. When the processor 820 executes the programs, the steps in any of the methods in the embodiments of the present disclosure may be implemented.

The memory 810 may be configured to store instructions and/or applications executable by the processor 820, and may also cache data to be processed or processed by the processor 820 and various modules in the electronic device (for example, image data, audio data, voice communication data and video communication data). The memory may be implemented through flash memory (FLASH) or random access memory (RAM).

When the processor 820 executes the program, the steps of any of the above control methods provided by various embodiments of the present disclosure may be implemented. The processor 820 may be configured to generally control the overall operation of the electronic device 800.

The processor may be an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, or a microprocessor. It is understandable that the electronic device that implements the above processor function may also be other, which is not specifically limited in the embodiments of the present disclosure.

The above-mentioned computer storage media/memory may be read-only memory (ROM), programmable read-only memory (PROM), erasable programmable read-only memory (EPROM), electrically erasable programmable read-only memory (EEPROM), ferromagnetic random access memory (FRAM), flash memory, magnetic surface memory, optical disk, or compact disc read-only memory (CD-ROM). The above-mentioned computer storage media/memory may also be various electronic devices including one or any combination of the above memories, such as mobile phones, computers, tablet devices, or personal digital assistants.

Each embodiment in this specification is described in a progressive mode, and each embodiment focuses on the difference from other embodiments. Same and similar parts of each embodiment may be referred to each other. As for the device disclosed in the embodiments, since it corresponds to the method disclosed in the embodiments, the description is relatively simple, and for relevant details, the reference may be made to the description of the method embodiments.

Units and algorithm steps of the examples described in conjunction with the embodiments disclosed herein may be implemented by electronic hardware, computer software or a combination of the two. To clearly illustrate the possible interchangeability between the hardware and software, in the above description, the composition and steps of each example have been generally described according to their functions. Whether these functions are executed by hardware or software depends on the specific application and design constraints of the technical solution. Those skilled in the art may use different methods to implement the described functions for each specific application, but such implementation should not be regarded as exceeding the scope of the present disclosure.

In the present disclosure, the drawings and descriptions of the embodiments are illustrative and not restrictive. The same drawing reference numerals identify the same structures throughout the description of the embodiments. In addition, figures may exaggerate the thickness of some layers, films, screens, areas, etc., for purposes of understanding and ease of description. It will also be understood that when an element such as a layer, film, region or substrate is referred to as being "on" another element, it may be directly on the another element or intervening elements may be present. In addition, "on" refers to positioning an element on or below another element, but does not essentially mean positioning on the upper side of another element according to the direction of gravity.

The orientation or positional relationship indicated by the terms "upper," "lower," "top," "bottom," "inner," "outer," etc. are based on the orientation or positional relationship shown in the drawings, and are only for the convenience of describing the present disclosure, rather than indicating or implying that the device or element referred to must have a specific orientation, be constructed and operated in a specific orientation, and therefore cannot be construed as a limitation of the present disclosure. When a component is said to be "connected" to another component, it may be directly connected to the other component or there may be an intermediate component present at the same time.

It should also be noted that in this article, relational terms such as "first" and "second" are only used to distinguish one entity or operation from another entity or operation, and do not necessarily require or imply that there is such actual relationship or sequence between these entities or operations them. Furthermore, the terms "comprises," "includes," or any other variation thereof are intended to cover a non-exclusive inclusion, such that an article or device including a list of elements includes not only those elements, but also other elements not expressly listed. Or it also includes elements inherent to the article or equipment. Without further limitation, an element defined by the statement "comprises a . . . " does not exclude the presence of other identical elements in an article or device that includes the above-mentioned element.

The disclosed equipment and methods may be implemented in other ways. The device embodiments described above are only illustrative. For example, the division of the units is only a logical function division. In actual implementation, there may be other division methods, such as: multiple units or components may be combined, or can be integrated into another system, or some features can be ignored, or not implemented. In addition, the coupling, direct coupling, or communication connection between the components shown or discussed may be through some interfaces, and the indirect coupling or communication connection of the devices or units may be electrical, mechanical, or other forms.

The units described above as separate components may or may not be physically separated. The components shown as units may or may not be physical units. They may be located in one place or distributed to multiple network units. Some or all of the units may be selected according to actual needs to achieve the purpose of the solution of the present disclosure.

In addition, all functional units in the embodiments of the present disclosure may be integrated into one processing unit, or each unit may be separately used as a unit, or two or more units can be integrated into one unit. The above-mentioned integration units can be implemented in the form of hardware or in the form of hardware plus software functional units.

All or part of the steps to implement the above method embodiments may be completed by hardware related to program instructions. The aforementioned program may be stored in a computer-readable storage medium. When the program is executed, the steps including the above method embodiments may be executed. The aforementioned storage media may include: removable storage devices, ROMs, magnetic disks, optical disks or other media that can store program codes.

When the integrated units mentioned above in the present disclosure are implemented in the form of software function modules and sold or used as independent products, they may also be stored in a computer-readable storage medium. Based on this understanding, the technical solutions of the embodiments of the present disclosure in essence or those that contribute to the existing technology may be embodied in the form of software products. The computer software products may be stored in a storage medium and include a number of instructions for instructing the product to perform all or part of the methods described in various embodiments of the present disclosure. The aforementioned storage media may include: random access memory (RAM), read-only memory (ROM), electrical-programmable ROM, electrically erasable programmable ROM, register, hard disk, mobile storage device, CD-ROM, magnetic disks, optical disks, or other media that can store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A control method comprising:
obtaining parameter information of a touch assembly of a first electronic device, the parameter information being related to sensing capability of the touch assembly; and
sending a notification message to a second electronic device based on the parameter information;
wherein:
the notification message is related to an intensity of a signal transmitted by the second electronic device to the touch assembly;
the first electronic device is configured to generate touch information based on the signal; and
the parameter information includes at least one of a capacitance value of a touch sensor of the touch assembly, a resistance value of the touch sensor, or environmental noise of environment where the touch assembly is located.

2. The method according to claim 1, wherein sending the notification message to the second electronic device based on the parameter information includes:
sending the notification message through a first channel between the touch assembly of the first electronic device and the second electronic device; or
sending the notification message to the second electronic device through a second channel between the first electronic device and the second electronic device, the first channel being different from the second channel.

3. The method according to claim 1, further comprising:
determining a signal-to-noise ratio based on the signal transmitted to the touch assembly and the parameter information;
updating the notification message based on the signal-to-noise ratio to obtain an updated notification message; and
sending the updated notification message to the second electronic device, to enable the second electronic device to adjust the intensity of the signal transmitted to the touch assembly based on the updated notification message.

4. The method according to claim 3, wherein updating the notification message based on the signal-to-noise ratio includes:
in response to the signal-to-noise ratio being within a preset threshold range, updating a type of the notification message to a first type, the first type indicating not to adjust the intensity of the signal transmitted by the second electronic device to the touch assembly;
in response to the signal-to-noise ratio being less than a lower limit of the preset threshold range, updating the type of the notification message to a second type, the second type indicating to increase the intensity of the signal transmitted by the second electronic device to the touch assembly; or
in response to the signal-to-noise ratio being larger than an upper limit of the preset threshold range, updating the type of the notification message to a third type, the third type indicating to reduce the intensity of the signal transmitted by the second electronic device to the touch assembly.

5. A non-transitory computer-readable storage medium storing a computer program that, when executed by a processor, causes the processor to implement the method according to claim 1.

6. The non-transitory computer-readable storage medium according to claim 5, wherein the computer program further causes the processor to:
send the notification message through a first channel between the touch assembly of the first electronic device and the second electronic device; or
send the notification message to the second electronic device through a second channel between the first electronic device and the second electronic device, the first channel being different from the second channel.

7. The non-transitory computer-readable storage medium according to claim 5, wherein the computer program further causes the processor to:
determine a signal-to-noise ratio based on the signal transmitted to the touch assembly and the parameter information;
update the notification message based on the signal-to-noise ratio to obtain an updated notification message; and
send the updated notification message to the second electronic device, to enable the second electronic device to adjust the intensity of the signal transmitted to the touch assembly based on the updated notification message.

8. The non-transitory computer-readable storage medium according to claim 7, wherein the computer program further causes the processor to:
in response to the signal-to-noise ratio being within a preset threshold range, update a type of the notification message to a first type, the first type indicating not to adjust the intensity of the signal transmitted by the second electronic device to the touch assembly;
in response to the signal-to-noise ratio being less than a lower limit of the preset threshold range, update the type of the notification message to a second type, the second type indicating to increase the intensity of the signal transmitted by the second electronic device to the touch assembly; or
in response to the signal-to-noise ratio being larger than an upper limit of the preset threshold range, update the type of the notification message to a third type, the third type indicating to reduce the intensity of the signal transmitted by the second electronic device to the touch assembly.

9. An electronic device comprising:
a processor; and
a memory storing a computer program that, when executed by the processor, causes the processor to implement the method according to claim 1.

10. A control method comprising:
receiving a notification message sent by a first electronic device, the notification message being related to an intensity of a signal sent by a second electronic device to a touch assembly of the first electronic device;
determining the intensity of the signal sent to the touch assembly of the first electronic device based on the notification message;
sending the signal with the determined intensity to the touch assembly of the first electronic device, to enable the first electronic device to generate touch information based on the signal;
receiving an updated notification message sent by the first electronic device; and
adjusting the intensity of the signal sent by the second electronic device to the touch assembly according to a type of the updated notification message, including:

in response to the type of the updated notification message being a third type, reducing the intensity of the signal.

11. A non-transitory computer-readable storage medium storing a computer program that, when executed by a processor, causes the processor to implement the method according to claim 10.

12. An electronic device comprising:
a processor; and
a memory storing a computer program that, when executed by the processor, causes the processor to implement the method according to claim 10.

13. An electronic system comprising:
a first electronic device; and
a second electronic device;
wherein:
the first electronic device includes a touch assembly and is configured to:
send a notification message to the second electronic device, the notification message being related to an intensity of a signal transmitted by the second electronic device to the touch assembly; and
generate touch information according to the signal sent by the second electronic device; and the second electronic device is configured to:
receive the notification message sent by the first electronic device;
determine the intensity of the signal transmitted to the touch assembly based on the notification message;
receive an updated notification message sent by the first electronic device; and
adjust the intensity of the signal sent by the second electronic device to the touch assembly according to a type of the updated notification message, including:
in response to the type of the updated notification message being a third type, reducing the intensity of the signal.

14. The system according to claim 13, wherein the first electronic device is further configured to:
determine a signal-to-noise ratio based on the signal transmitted to the touch assembly and parameter information;
update the notification message based on the signal-to-noise ratio to obtain the updated notification message; and
send the updated notification message to the second electronic device.

\* \* \* \* \*